United States Patent
Qu et al.

(10) Patent No.: US 8,063,527 B2
(45) Date of Patent: Nov. 22, 2011

(54) GAS TURBINE ENGINE ASSEMBLY INCLUDING DUAL SIDED/DUAL SHAFT ELECTRICAL MACHINE

(75) Inventors: Ronghai Qu, Clifton Park, NY (US); John M. Kern, Rexford, NY (US); Wei Wu, Canton, MI (US); Juan M. De Bedout, Clifton Park, NY (US); Manoj R. Shah, Latham, NY (US); Ayman Mohamed Fawzi El-Refaie, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/794,001

(22) Filed: Jun. 4, 2010

(65) Prior Publication Data
US 2010/0244446 A1  Sep. 30, 2010

Related U.S. Application Data

(62) Division of application No. 11/567,850, filed on Dec. 7, 2006, now Pat. No. 7,750,521.

(51) Int. Cl.
*H02K 16/02* (2006.01)
(52) U.S. Cl. .......................... 310/112; 310/114

(58) Field of Classification Search .......... 310/112–114, 310/154.01, 154.33, 266, 268, 115
See application file for complete search history.

(56) References Cited

U.S. PATENT DOCUMENTS

| 5,376,827 | A  | * | 12/1994 | Hines ............................ 290/52 |
| 5,555,722 | A  | * | 9/1996 | Mehr-Ayin et al. ............ 60/788 |
| 5,694,765 | A  | * | 12/1997 | Hield et al. ................. 60/39.163 |
| 6,378,293 | B1 | * | 4/2002 | Care et al. ................... 60/226.1 |
| 6,768,237 | B1 | * | 7/2004 | Schroedl ....................... 310/114 |
| 6,825,640 | B1 | * | 11/2004 | Hill et al. ........................ 322/46 |
| 2003/0184245 | A1 | * | 10/2003 | Arimitsu ....................... 318/268 |
| 2006/0066110 | A1 | * | 3/2006 | Jansen et al. .................... 290/44 |

* cited by examiner

*Primary Examiner* — Quyen Leung
*Assistant Examiner* — Naishadh Desai
(74) *Attorney, Agent, or Firm* — General Electric Company; Marcella R. Louke

(57) ABSTRACT

A gas turbine engine assembly includes an electromagnetic machine for extracting power from the turbine engine. The electromagnetic machine includes an outer rotor and an inner rotor rotatably supported adjacent to a stator disposed between the inner and outer rotors. The stator has an inner set of windings disposed on an inner surface adjacent to the inner rotor, and an outer set of windings on an outer surface of the stator adjacent to the outer rotor. The inner stator windings form a set of multiple-phase windings, and the outer stator windings form a set of multiple-phase windings.

9 Claims, 6 Drawing Sheets

GAS TURBINE ENGINE ASSEMBLY INCLUDING DUAL SIDED/DUAL SHAFT ELECTRICAL MACHINE

CROSS-REFERENCE TO RELATED APPLICATIONS

This application is a divisional application of U.S. patent application Ser. No. 11/567,850, filed Dec. 7, 2006, now U.S. Pat. No. 7,750,521, the entirety of which is incorporated herein by reference.

FIELD OF THE INVENTION

The present invention is directed to a gas turbine engine assembly including a dual sided/dual shaft electrical machine for extracting power from the gas turbine engine.

BACKGROUND OF THE INVENTION

A gas turbine engine generally includes one or more compressors followed in turn by a combustor and high and low pressure turbines. These engine components are arranged in serial flow communication and disposed about a longitudinal axis centerline of the engine within an annular outer casing. The compressors are driven by the respective turbines and compressor air during operation. The compressor air is mixed with fuel and ignited in the combustor for generating hot combustion gases. The combustion gases flow through the high and low pressure turbines, which extract the energy generated by the hot combustion gases for driving the compressors, and for producing auxiliary output power.

The engine power is transferred either as shaft power or thrust for powering an aircraft in flight. For example, in other rotatable loads, such as a fan rotor in a by-pass turbofan engine, or propellers in a gas turbine propeller engine, power is extracted from the high and low pressure turbines for driving the respective fan rotor and the propellers.

It is well understood that individual components of turbofan engines, in operation, require different power parameters. For example, the fan rotational speed is limited to a degree by the tip velocity and, since the fan diameter is very large, rotational speed must be very low. The core compressor, on the other hand, because of its much smaller tip diameter, can be driven at a higher rotational speed. Therefore, separate high and low turbines with independent power transmitting devices are necessary for the fan and core compressor in aircraft gas turbine engines. Furthermore since a turbine is most efficient at higher rotational speeds, the lower speed turbine driving the fan requires additional stages to extract the necessary power.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting this additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than rely solely on the HP engine spool to drive the electrical generators. The LP engine spool provides an alternate source of power transfer, however, the relatively lower speed of the LP engine spool typically requires the use of a gearbox, as slow-speed electrical generators are often larger than similarly rated electrical generators operating at higher speeds. The boost cavity of gas turbine engines has available space that is capable of housing an inside out electric generator, however, the booster section rotates at the speed of the LP engine spool.

However, extracting this additional mechanical power from an engine when it is operating at relatively low power levels (e.g., at or near idle descending from altitude, low power for taxi, etc.) may lead to reduced engine operability. Traditionally, this power is extracted from the high-pressure (HP) engine spool. Its relatively high operating speed makes it an ideal source for mechanical power to drive electrical generators that are attached to the engine. However, it is desirable at times to increase the amount of power that is available on this spool, by transferring torque and power to it via some other means.

Another source of power within the engine is the low-pressure (LP) spool, which typically operates at speeds much slower than the HP spool, and over a relatively wider speed range. Tapping this low-speed mechanical power source without transformation result in impractically large generators.

Many solutions to this transformation are possible, including various types of conventional transmissions, mechanical gearing, and electromechanical configurations.

One solution is a turbine engine that utilizes a third, intermediate-pressure (IP) spool to drive a generator independently. However, this third spool is also required at times to couple to the HP spool. The means used to couple the IP and HP spools are mechanical clutch or viscous-type coupling mechanisms.

U.S. Pat. No. 6,895,741, issued May 24, 2005, and entitled "Differential Geared Turbine Engine with Torque Modulation Capacity", discloses a mechanically geared engine having three shafts. The fan, compressor, and turbine shafts are mechanically coupled by applying additional epicyclic gear arrangements. The effective gear ratio is variable through the use of electromagnetic machines and power conversion equipment.

U.S. Pat. No. 6,924,574 discloses a dual-rotor, radial-flux, toroidally-wound, permanent-magnet machine having improved electrical machine torque density and efficiency. At least one concentric surface-mounted permanent magnet dual-rotor is located inside and outside of a torus-shaped stator with back-to-back windings, respectively. The permanent magnet machine includes at least one permanent magnet rotor having a generally cylindrical shape with an inner rotor component and an outer rotor component, and at least one stator having a hollow cylindrical shape positioned within an opening between the inner and outer components of the permanent magnet rotor. A plurality of polyphase windings of electrical wires are wound around the at least one stator.

Therefore, there is a need for a gas turbine engine with a compact motor/generator that is capable of generating electric power from both the LP and HP engine spools.

SUMMARY OF THE INVENTION

An exemplary embodiment is directed to a gas turbine engine comprising a fan, compressor, high pressure turbine, low pressure turbine, and an electrical machine all arranged coaxially. The electrical machine includes a fixed stator element, a first rotor element, and a second rotor element. Each rotor element is independently rotatable with respect to the stator element. The first rotor element is connected with a shaft of the high pressure turbine, and the second rotor element is connected with a shaft of the low pressure turbine. The stator element has inner and outer multiple phase winding sets. Each of the winding sets is configured to generate separate power outputs or to receive a separate excitation power source. The inner and outer winding sets are mutually exclusive. Each rotor element is configured to generate electrical power through electromagnetic coupling with the stator element when driven by the associated high or low pressure turbine shaft, or to electrically drive the associated high or low pressure turbine shaft when excited by an external electrical power source.

One exemplary embodiment is directed to a dual sided, dual shaft (DSDS) electrical machine comprising a fixed stator element, a first rotor element, and a second rotor element. Each rotor element is independently rotatable with respect to the stator. The first rotor is mechanically connected with a shaft of a first turbine, and the second rotor is connected with a shaft of the second turbine. The stator element has inner and outer multi-phase winding sets. Each of the winding sets is configured to generate separate power outputs or to receive a separate excitation power source. Also, each of the opposing, mutually exclusive winding sets is adjacent to a respective rotor and separated from the associated rotor by an air gap. The inner and outer winding sets are mutually exclusive. Each of the inner and outer stator windings are configured for independent multi-phase windings and each of the inner and outer rotors are concurrently driven by rotatable shafts of the first and second turbines. The rotatable shafts of the first and second turbines are mutually exclusive. The independent first and second rotor shafts of the electrical machine rotate the first and second rotors, respectively, at different speeds. One of the rotors operates as a generator and the other operates as a motor.

Other features of the embodiments disclosed herein will be apparent from the following more detailed description, taken in conjunction with the accompanying drawings which illustrate, by way of example, the principles of the invention.

DETAILED DESCRIPTION OF THE INVENTION

Figure 1:
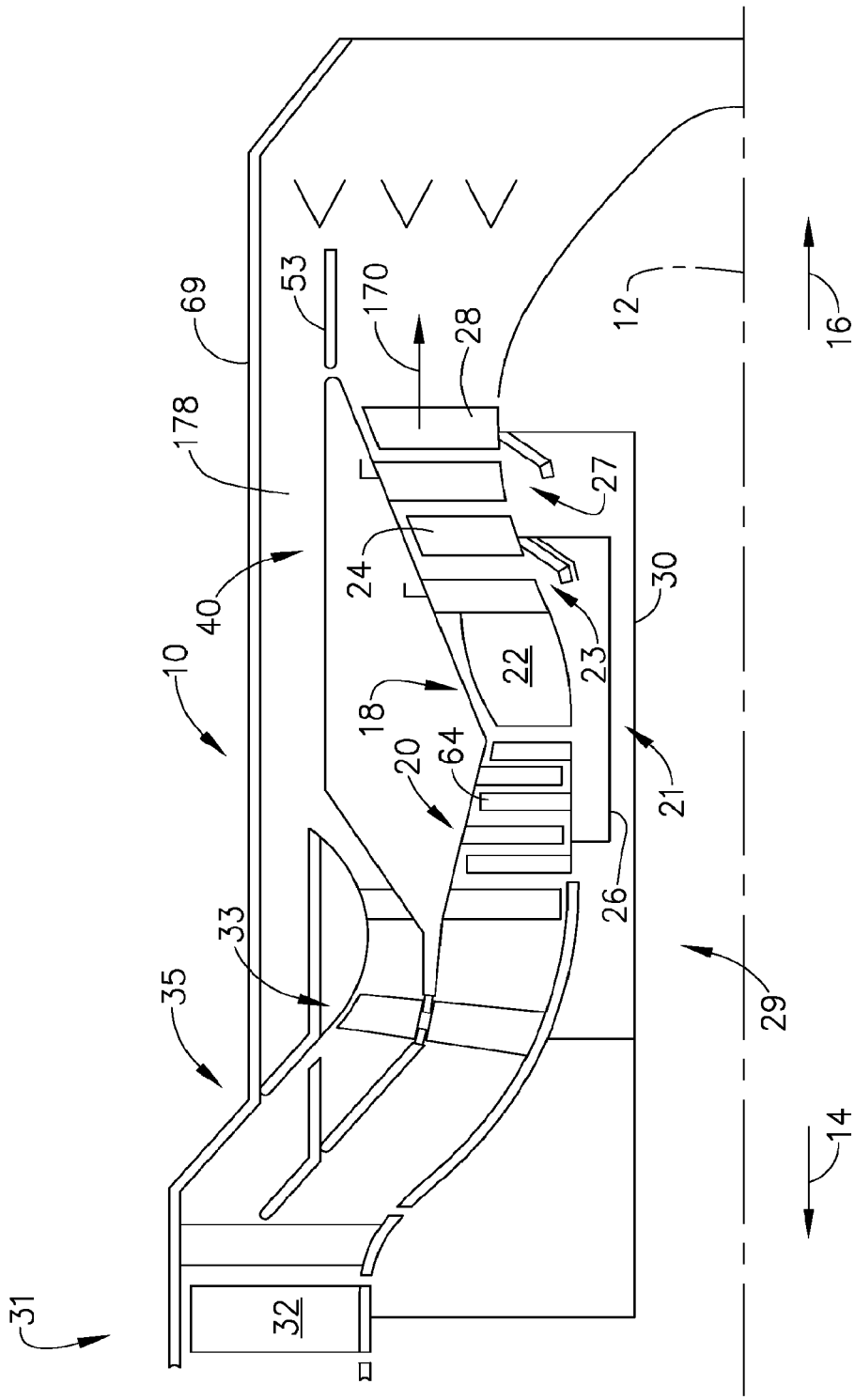
FIG. 1 is a longitudinal sectional view schematic illustration of an exemplary aircraft turbofan gas turbine engine.

Illustrated in FIG. 1 is an exemplary turbofan engine 10 having a generally axially extending axis or centerline 12 generally extending in a forward direction 14 and an aft direction 16. The bypass turbofan engine 10 includes a core engine 18 (also called a gas generator) which includes a high pressure compressor 20, a combustor 22, and a high pressure turbine (HPT) 23 having a row of high pressure turbine blades 24, all arranged in a serial, axial flow relationship. High-pressure compressor blades 64 of the high-pressure compressor 20 are fixedly connected in driving engagement to the high pressure turbine blades 24 by a larger-diameter annular core engine shaft 26 which is disposed coaxially about the centerline 12 of the engine 10 forming a high pressure spool 21.

A combustor 22 in the core engine 18 mixes pressurized air from the high-pressure compressor 20 with fuel and ignites the resulting fuel and air mixture to produce combustion gases. Some work is extracted from these gases by the high-pressure turbine blades 24 which drives the high pressure compressor 20. The combustion gases are discharged from the core engine 18 into a power turbine or low-pressure turbine (LPT) 27 having a row of low pressure turbine blades 28. The low-pressure turbine blades 28 are fixedly attached to a smaller diameter annular low-pressure shaft 30 which is disposed coaxially about the centerline 12 of the engine 10 within the core engine shaft 26 forming a low pressure spool 29. The low pressure shaft 30 rotates axially spaced-apart first and second stage fans 31 and 33 of an engine fan section 35. The first and second stage fans 31 and 33 include first and second stage rows of generally radially outwardly extending and circumferentially spaced-apart first and second stage fan blades 32 and 36, respectively.

A fan bypass duct 40 circumscribes the second stage fan 33 and the core engine 18. Core discharge airflow 170 is discharged from the low pressure turbine 27 to mix with a bypass airflow 178 discharged from the fan bypass duct 40 through a rear variable area bypass injector (VABI) 53. Mixing takes place in a tail pipe 69 in which exhaust flow is formed which is discharged through a variable area exhaust nozzle. An optional afterburner 130 may be used to increase the thrust potential of the engine 10.

Figure 2:
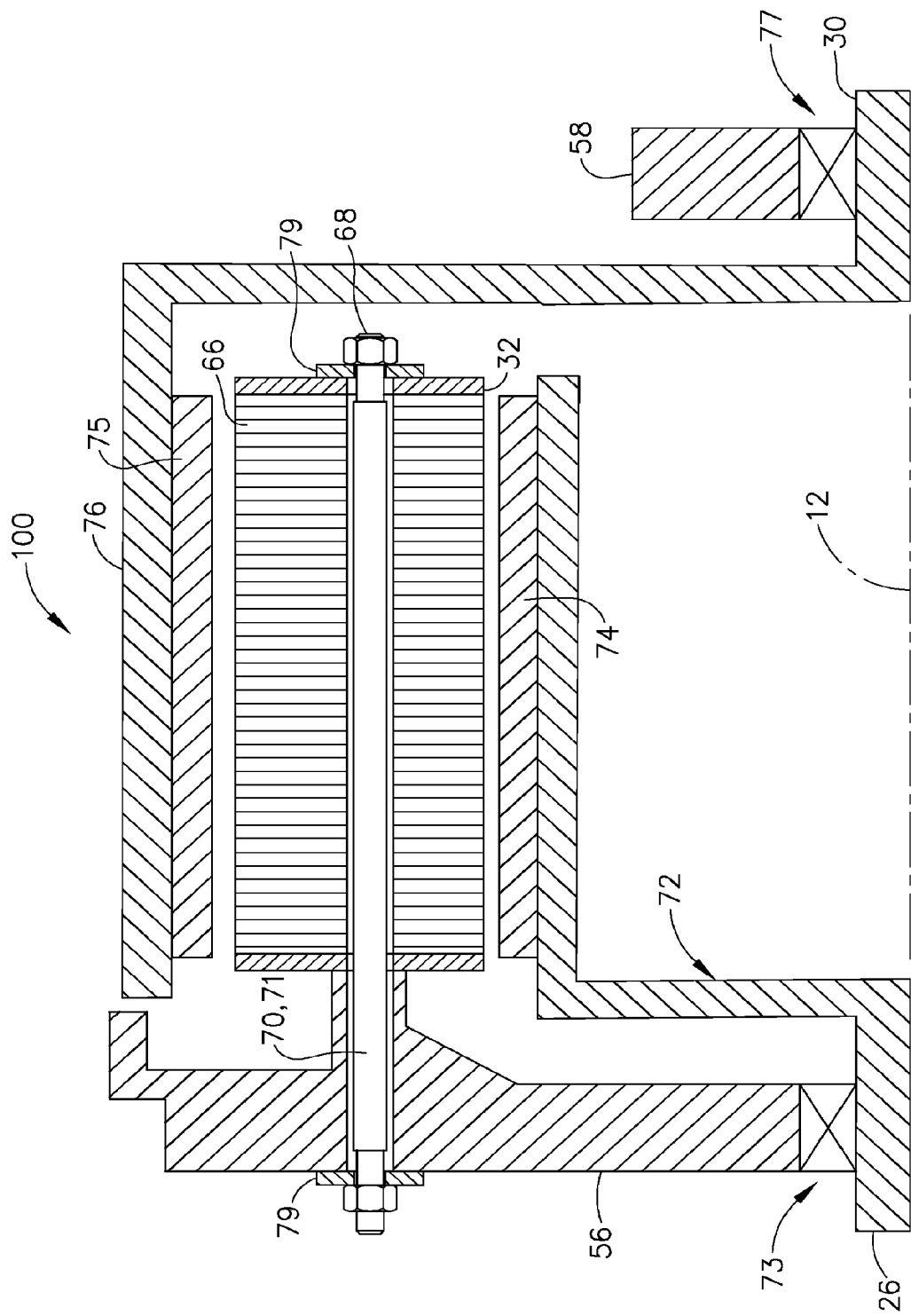
FIG. 2 is a partial axial cross-sectional view of the double-sided electrical machine of the present invention.

Referring to FIG. 2, a double-sided, dual-shaft (DSDS) electrical machine is generally designated as 100. The inner and outer rotors 72, 76, are independent and rotatable at different velocity. Each rotor 72, 76 has at least one bearing 73, 77 for each shaft 30, 26, respectively. The bearing position and type may vary based on application requirements.

Figure 3:
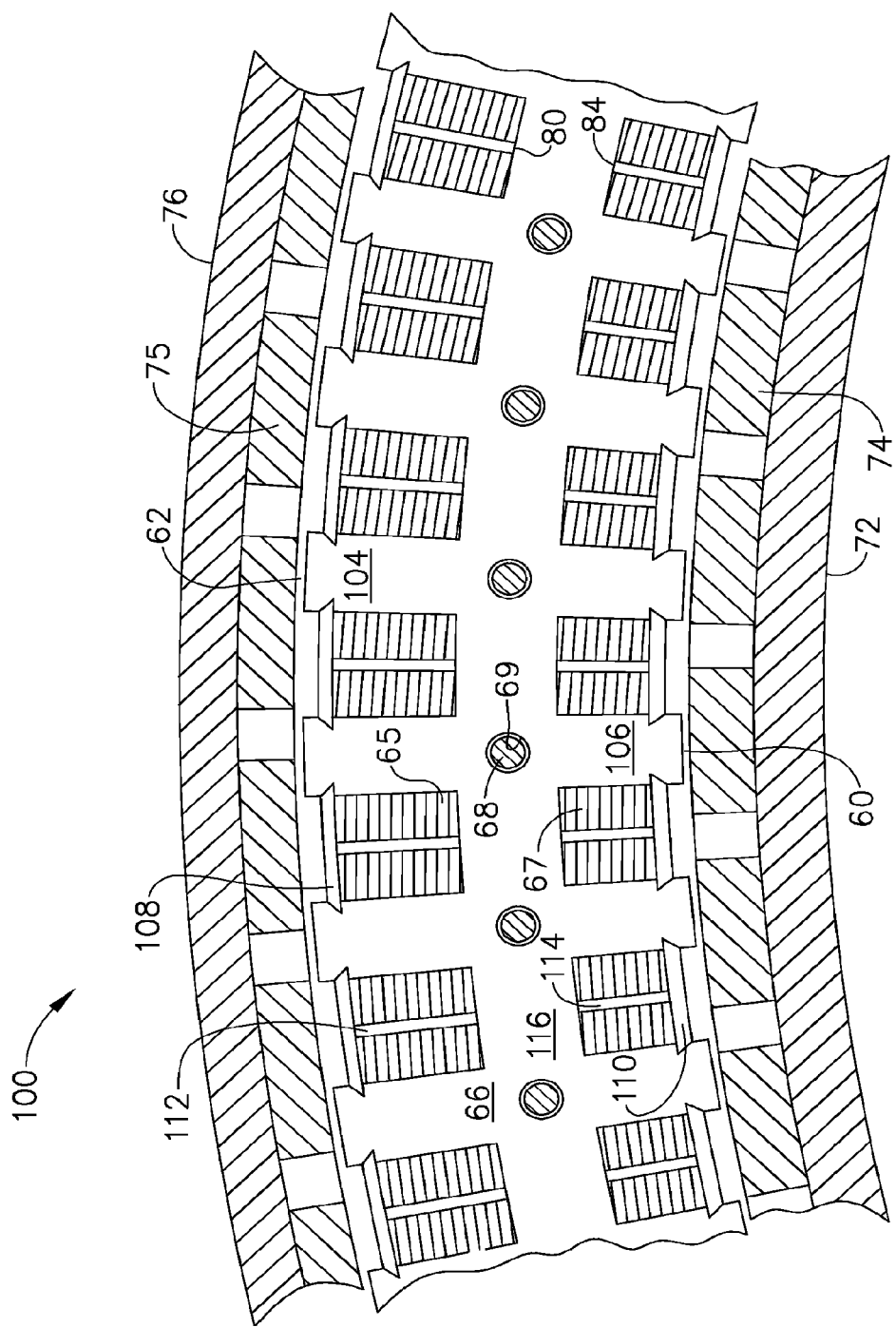
FIG. 3 is a partial cross-sectional view of the double-sided electrical machine of the present invention.

Referring next to FIGS. 2 and 3, the turbine engine 10 includes a DSDS machine 100 comprising an outer rotor core 76 and an inner rotor core 72, which are generally hollow cylindrical components with a stator portion 66 disposed concentrically between the inner and outer rotor cores 72, 76 about the axis 12. Opposing frame sections 56, 58 provide rigid support for stator portion 66 inside the engine 10, and include central openings for bearings 73, 77, for rotatably supporting the LP shaft 30 and the HP shaft 26. An inner set of stator windings 67 are mounted on the radially inner surface of the stator portion 66. Inner stator windings 67 are interconnected to form a first set of multiple-phase windings 88 (see, e.g., FIGS. 5 & 6). An outer set of stator windings 65 are mounted on the radially outer surface of the stator portion 66. Outer stator windings 65 are interconnected to form a second set of multiple-phase windings 89 (see, e.g., FIGS. 5 & 6). The outer rotor core 76 has outer permanent magnets 75 and an inner rotor core 72 with inner permanent magnets 74. The stator portion 66 has outer tooth portions 104 and inner tooth portions 106, which are separated by slots 80, 84. The outer stator windings or coils 65 and the inner stator windings or coils 67 are retained in slots 80, 84, respectively by the outer stator coil retaining wedge 108 and inner stator coil retaining wedge 110. An outer air gap 62 is defined between the double-sided stator portion 66 and the permanent magnets 75 attached to the outer rotor 76, and an inner air gap 64 is defined between the stator portion 66 and the permanent magnets 74 attached to the inner rotor 72. In the embodiment, shown in FIG. 3, the stator portion 66 is structurally reinforced through compression of a lamination stack by a plurality of circumferentially spaced bolts 68 arranged parallel with the axis 12 in the stator yoke portion 116. The bolt shafts 70 and at least one bolt end 68 are insulated from the laminations and frame structures by insulator tubes 71 and insulator rings 79 to avoid induced electrical currents and resulting losses and heating. In the example shown in FIG. 3, one bolt per slot is used and the bolthole positions are aligned with stator teeth 104, 106, e.g., with boltholes 69, however, more or less bolts may be used, as will be appreciated by those skilled in the art. Also illustrated are air cavity 112 between outer stator windings 65 and the air cavity 114 between the inner stator windings 67 for air-cooling the windings 65, 67.

The stator windings 65, 67 disposed in the slots 80, 84 defined between pairs of tooth portions 104, 106, are arranged side-by-side in FIG. 3. The windings 65, 67 are preferably toroidally-wound around the stator tooth portions 104, 106. These windings may also be arranged in top and bottom layers, or as a single coil per slot 80, 84. The inner coils 67 are interconnected to form one set of multiple-phase windings, and the outer coils 65 are interconnected to form a second set of multiple-phase windings. A converter 90 (see, e.g., FIGS. 5 and 6) is connected to drive each set of windings, respectively, so that each set of windings can be operated independently. Therefore, in general, the HP and LP shafts 30, 26 can rotate concurrently in the same or in opposite directions, and may be controlled for operation at matching velocity or at separate and distinct velocities.

The poles 74, 75 in this exemplary embodiment are surface-mounted permanent magnet poles. Alternatively, interior permanent magnet poles, wound-field poles, reluctance rotor poles, cage or wound induction type poles, etc. may be used in place of the permanent magnet poles for either or both rotors 72, 76. The numbers of pole, slots, and phases for the inner and outer machines may vary, depending on the particular electrical power requirements. Further, the two sides can be configured and optimized independently.

Reliability and fault tolerance is important for all electrical machines used in an aircraft. According to the present invention, the multiple-phase windings from either the inner rotor portion 72 or the outer rotor portion 76 can be separated into multiple sets, wherein each set of phase(s) is driven by an individual converter 90. Thus, in case of failure of a converter 90 or a machine winding 65, 67, only one set of phase(s) is rendered inoperable, while the remaining phases remain operable to provide power to the aircraft.

Figure 4:
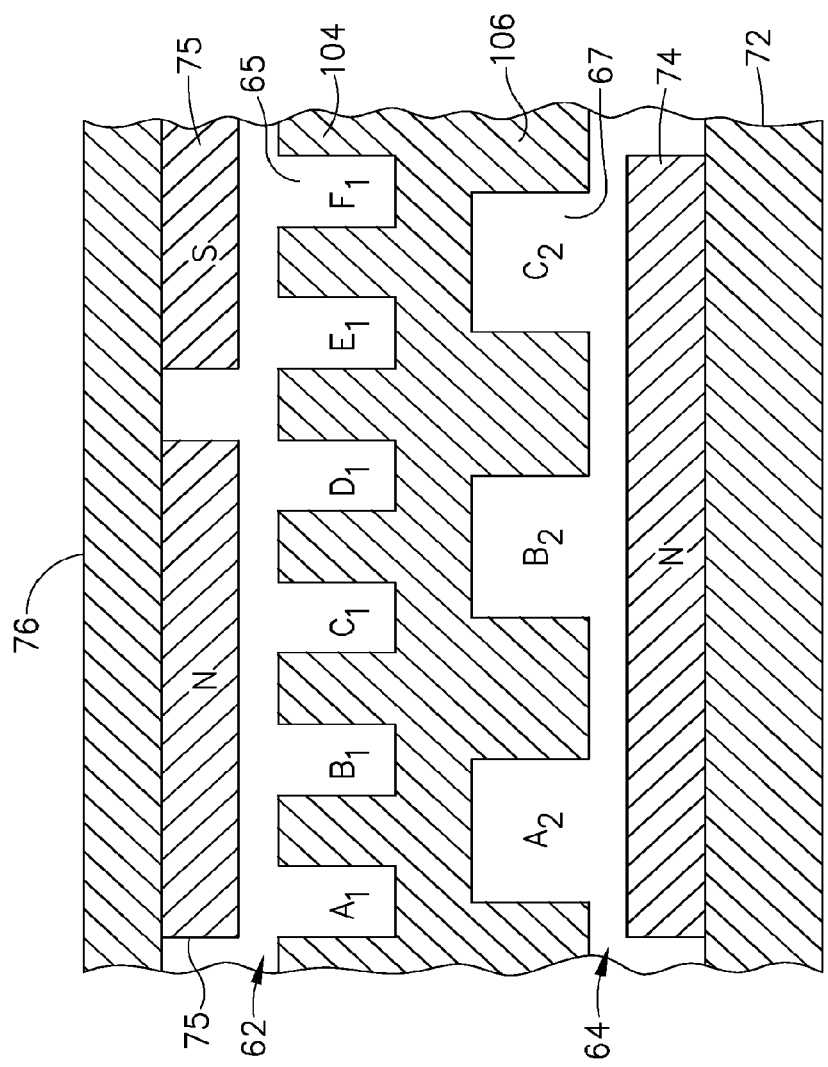
FIG. 4 is a partial cross-sectional schematic illustration of the double-sided electrical machine of the present invention with different number of phases for inner and outer portions.

Referring to FIG. 4, an exemplary embodiment of the present invention whereby inner and outer stator windings 67, 65 are configured in independent multi-phase generators. The outer set of windings 65 are arranged in six phases of multi-phase windings 65 designated as $A_1$ through $F_1$. Permanent magnets 75 alternate in polarity between north (N) and south (S), which induce electromagnetic energy in windings $A_1$ through $F_1$ as the magnets 75 are rotated on outer rotor 76 past the windings $A_1$ through $F_1$ to form a magnetic flux path with the stator tooth portions 104 across air gap 62. The inner stator tooth portions 67 are arranged in this example into three phases of multi-phase windings $A_2$ through $C_2$, which are independent of phase windings $A_1$ through $F_1$. Permanent magnet 74 provides the sole source of excitation of all three of phase windings $A_2$ through $C_2$ associated with the inner stator windings 67, as the magnets 74 are rotated on inner rotor 72 past the windings $A_2$ through $C_2$ to form a magnetic flux path with the stator tooth portions 106 across air gap 64.

Figure 5:
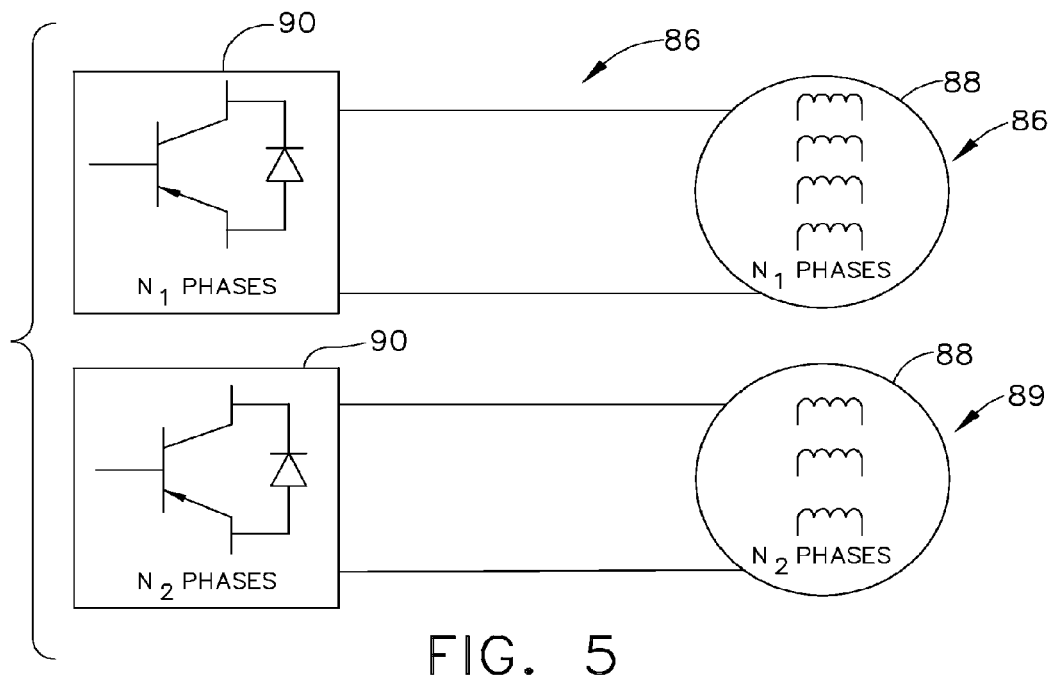
FIG. 5 is a schematic representation of one exemplary interconnection between the double-sided machine and power converter.
Figure 6:
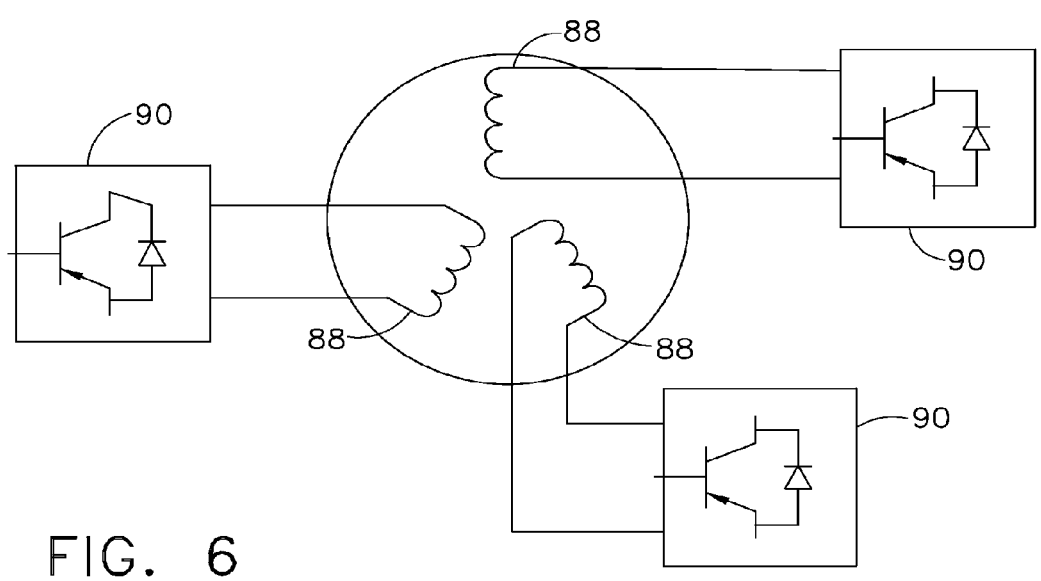
FIG. 6 is a schematic representation of another exemplary interconnection between the double-sided machine and power converter.

Referring to FIGS. 5 & 6, each set of multiple-phase windings 88 are driven by a converter 90, to permit each set of windings 88 to operate independently of the other. Therefore, shafts 26, 30 can concurrently rotate (a) in opposite directions, (b) in the same direction at different velocity, or (c) in the same direction and at the same velocity.

FIGS. 5 & 6 are exemplary implementations wherein multiple-phase windings 88 are separated into multiple sets. In FIG. 5, there are two sets 88 of phase windings—a first set of phase windings 86 configured with N1 phases, and a second set of phase windings 89 configured with N2 phases. Each phases winding set 86, 89 is driven by an individual converter 90. In an alternate embodiment, shown in FIG. 6, 3-phase windings 88 are each driven by individual, dedicated converter units 90.

Figure 7:
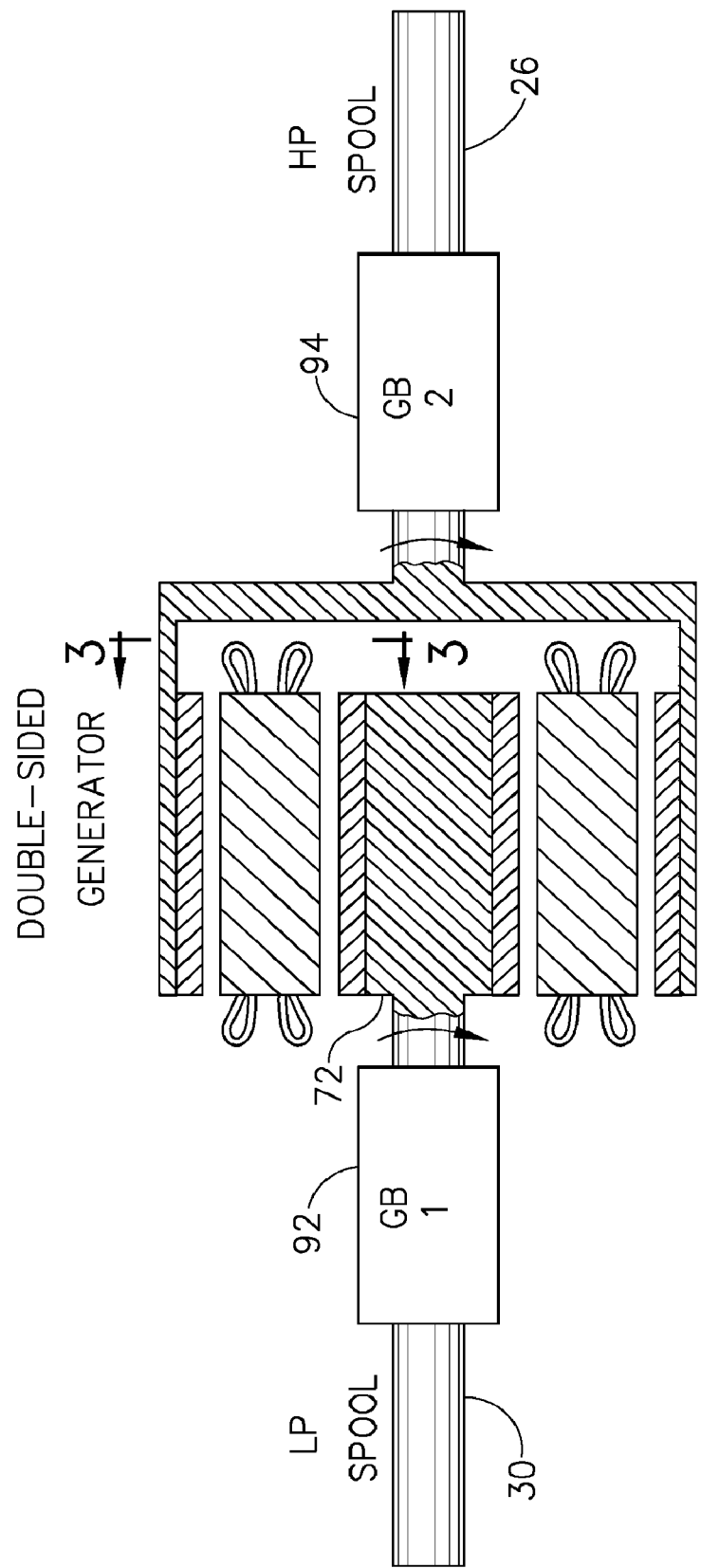
FIG. 7 is a schematic representation of a double-sided electric machine of the present invention connected to Low Pressure and High Pressure spools.

FIG. 7 illustrates an embodiment of the double-sided electrical machine 100 in an aircraft engine. The DSDS machine 100 is connected to both the LP spool 30 and HP spool 26, to generate electric power and, in some instances, to start the HP spool 26. The LP spool 26 is connected to the inner rotor 72 through a gearbox 92. The gearbox 92 may be either a mechanical gearbox or a magnetic gearbox. The outer rotor 76 is connected to the HP spool 30 through another gearbox 94 that may likewise be a mechanical or magnetic device. The DSDS machine 100 can extract mechanical power from either inner rotor 72 or the outer rotor 76 into electric power as needed. The relative amount of electric power extracted from the HP or LP turbines through either shaft 26, 30 is fully controllable through the converter 90 and the machine is designed accordingly. The gearboxes 92, 94 on the both sides are optional, and either or both gearboxes can be removed depending on the system design parameters. Also, depending on the torque level and maximum velocity of the DSDS machine 100, the HP shaft 30 may be connected to the inner rotor and the LP shaft 26 connected to the outer rotor.

While the double-sided machine has been generally described as two generator configurations, it will be appreciated by those practitioners skilled in the art of electric machines that the DSDS machine may operate as a starter motor for the turbine engine 10 by energizing either set of inner or outer windings 65, 67, thus inducing rotation in one of the rotor portions 72, 76. Preferably, the rotor connected to the HP turbine shaft is used as a starting motor, although either rotor may be operable as a starting motor to start the engine 10.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A gas turbine assembly comprising; a fan, a compressor, a high pressure turbine and a low pressure turbine in serial flow communication, and an electrical machine arranged coaxially; the electrical machine comprising: a fixed stator element, a first rotor element and a second rotor element, the first and second rotor elements independently rotatable with respect to the stator element; the first rotor element mechanically connected with a shaft of the high pressure turbine, and the second rotor element being connected with a shaft of the low pressure turbine; the stator element having inner and outer multiple-phase winding sets wound thereon, each of the winding sets configured to generate separate power outputs or to receive a separate excitation power source, the inner and outer winding sets being mutually exclusive; wherein each of the first and second rotor elements are configured to generate electrical power through electromagnetic coupling with the stator element when driven by the associated high or low pressure turbine shaft, or to electrically drive the associated high or low pressure turbine shaft when excited by an external electrical power source.

2. The gas turbine assembly of claim 1, wherein the shaft of each turbine optionally includes a gearbox operably connected to the respective rotor.

3. The gas turbine assembly of claim 1, wherein the electrical machine further comprises a plurality of converters, each of the converters connected to a winding set to independently drive the associated winding set.

4. The gas turbine assembly of claim 1, wherein the first and second rotor shafts rotate the first and second rotor elements, respectively, at different speeds, and wherein one of the first and second rotor elements operates as a generator and the other rotor element operates as a motor.

5. The gas turbine assembly of claim 1, wherein the stator element includes a pair of opposite windings, each opposing set of stator windings being adjacent to a respective rotor, and separated from the associated rotor by an air gap, wherein the speed and the direction of rotation of the each rotor shaft is independent of the other.

6. A dual sided, dual shaft electrical machine comprising: a fixed stator element, a first rotor element and a second rotor element, the first and second rotor elements independently rotatable coaxially with respect to the stator element; the first rotor element mechanically connected with a shaft of a first turbine, and the second rotor element being connected with a shaft of the second turbine; the stator element having inner and outer multiple-phase winding sets wound thereon, each of the winding sets configured to generate separate power outputs or to receive a separate excitation power source, the inner and outer winding sets being mutually exclusive; wherein each of the inner stator windings and the outer stator windings are configured for independent multi-phase windings and each of the first and second rotor elements are concurrently driven by rotatable shafts of the first and second turbines, the rotatable shafts being mutually independent.

7. The electrical machine of claim 6, further comprising a plurality of converters, each of the converters connected to a winding set to independently drive the associated winding set.

8. The electrical machine of claim 6, wherein the first and second rotor shafts rotate the first and second rotor elements, respectively, at different speeds, and wherein one of the first and second rotor elements operates as a generator and the other rotor element operates as a motor.

9. The electrical machine of claim 6, wherein the stator element includes a pair of opposite windings, each opposing set of stator windings being adjacent to a respective rotor, and separated from the associated rotor by an air gap, wherein the speed and the direction of rotation of each rotor shaft is independent of the other.

* * * * *